United States Patent [19]

Jensen et al.

[11] Patent Number: 5,329,906

[45] Date of Patent: Jul. 19, 1994

[54] LOW EMISSION DUEL FUEL VALVE STRUCTURE

[75] Inventors: Scott P. Jensen; Mitchel J. Gillispie, both of Tacoma; Robert A. McLean, Puyallup, all of Wash.

[73] Assignee: Energy Conversions, Inc., Tacoma, Wash.

[21] Appl. No.: 109,811

[22] Filed: Aug. 16, 1993

[51] Int. Cl.⁵ .................... F02D 19/08; F02M 61/14
[52] U.S. Cl. ...................... 123/470; 123/299
[58] Field of Search .......... 123/468, 469, 470, 27 GE, 123/299, 300

[56] References Cited

U.S. PATENT DOCUMENTS

| | | | |
|---|---|---|---|
| 1,857,256 | 5/1932 | Nordberg | 123/27 GE |
| 3,334,617 | 8/1967 | Palkowsky | 123/470 |
| 4,091,772 | 5/1978 | Heater et al. | 123/27 GE |
| 4,203,402 | 5/1980 | Freyn | 123/470 |
| 4,206,725 | 6/1980 | Jenkel et al. | 123/470 |
| 4,368,702 | 1/1983 | Finsterwalder et al. | 123/299 |
| 4,615,323 | 10/1986 | LeBlanc et al. | 123/470 |
| 4,811,708 | 3/1989 | Gruden | 123/299 |
| 4,901,700 | 2/1990 | Knight et al. | 123/470 |
| 5,125,383 | 6/1992 | Meier et al. | 123/470 |

FOREIGN PATENT DOCUMENTS 1038529  8/1983  U.S.S.R. ................ 123/470

*Primary Examiner*—E. Rollins Cross
*Assistant Examiner*—Thomas N. Moulis
*Attorney, Agent, or Firm*—Leo Gregory

[57] ABSTRACT

This invention relates to a dual fuel engine cylinder with primary interest focused upon an injector valve for an alternate fuel in which the body of the valve is disposed into said cylinder through the head thereof and may be removed therefrom as for servicing without disturbing the remaining operation of the cylinder.

1 Claim, 2 Drawing Sheets

LOW EMISSION DUEL FUEL VALVE STRUCTURE

BACKGROUND OF THE INVENTION

1. Field of Invention

This invention relates to a dual fuel internal combustion engine such as of a diesel engine that is operated using more than one type of fuel. Engines having more than one port in a cylinder head provide access for a fuel injector to inject fuel such as diesel into the combustion chamber through one port and provide access for a fuel injector of an alternate fuel such as natural gas through a second port.

2. Brief Description of Prior Art

In the previous art, the application of the use of two fuels or alternate fuels for an internal combustion engine is known art. With the advance of technology, this concept is using two or alternate fuels has taken on new developments. Otto cycle engines have commonly admitted fuel in the air intake manifold where the intake air carries the fuel into the combustion chamber.

Alternate fuels have been introduced easily into these engines in like manner. Diesel cycle engines of a four cycle design have utilized this type of fuel admission for gas fuels except they are faced with fuel losses due to the cam timing utilized in diesel engines. In order to avoid this on large four cycle engines and all two cycle diesel engines, a valve mechanism is installed in the cylinder head to control the intake of the alternate fuel. However, the valve device unlike a removable injector, requires the removal of the cylinder head for servicing.

It is all object herein to design a cylinder head having an additional port allowing a fuel control device to be installed for the purpose of injecting an alternate fuel directly into the combustion chamber. This additional port and the injector therein is not an integral part but an independent part of the cylinder head and is servicable separately without disturbing the remainder of the cylinder head.

SUMMARY OF THE INVENTION

The invention herein relates to the operation of an internal combustion engine with a mixture of liquid and gaseous fuel in which there is a direct gaseous fuel injection into the combustion chamber and in which the valve timing is very nicely arranged.

However the principal object herein relates to the design of a cylinder head which has a gaseous fuel injector valve bore in addition to the fuel oil injector bore and four exhaust valves. Provision is made in the casting for the first mentioned bore to receive a gas injector valve.

The bore is machined to size for the gaseous fuel injector valve which seats on a counter bore at the inner bottom of the bore. The valve is held in place by a plate fastened to the top of the cylinder head with adjusting hold down bolts. Thus the gaseous fuel injector valve is an integral yet independent part of the cylinder.

The particular arrangement here is designed to permit the gaseous fuel injector valve to be serviced, by removal, if necessary, through the top of the cylinder head instead of requiring the valve body to be removed through the bottom of the cylinder head which would affect the operation of the entire cylinder head.

The essential object and purpose herein is to provide a structural arrangement to permit the service which may be required by the gaseous fuel injector valve to be carried out without disturbing the remainder of the cylinder and with the least possible amount of inconvenience.

These and other objects and advantages will be set forth in the following description made in connection with the accompanying drawings in which like reference characters refer to similar parts throughout the several views.

DESCRIPTION OF A PREFERRED EMBODIMENT

Figure 1:
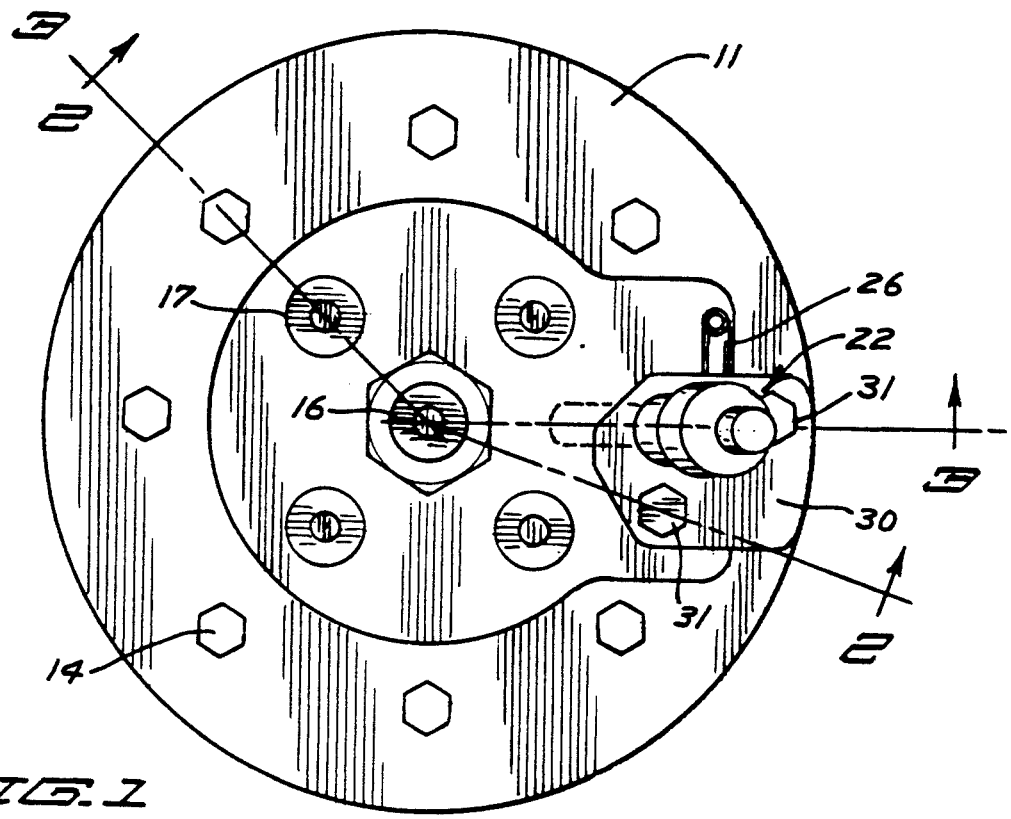
FIG. 1 is a top plan view of a cylinder head.
Figure 2:
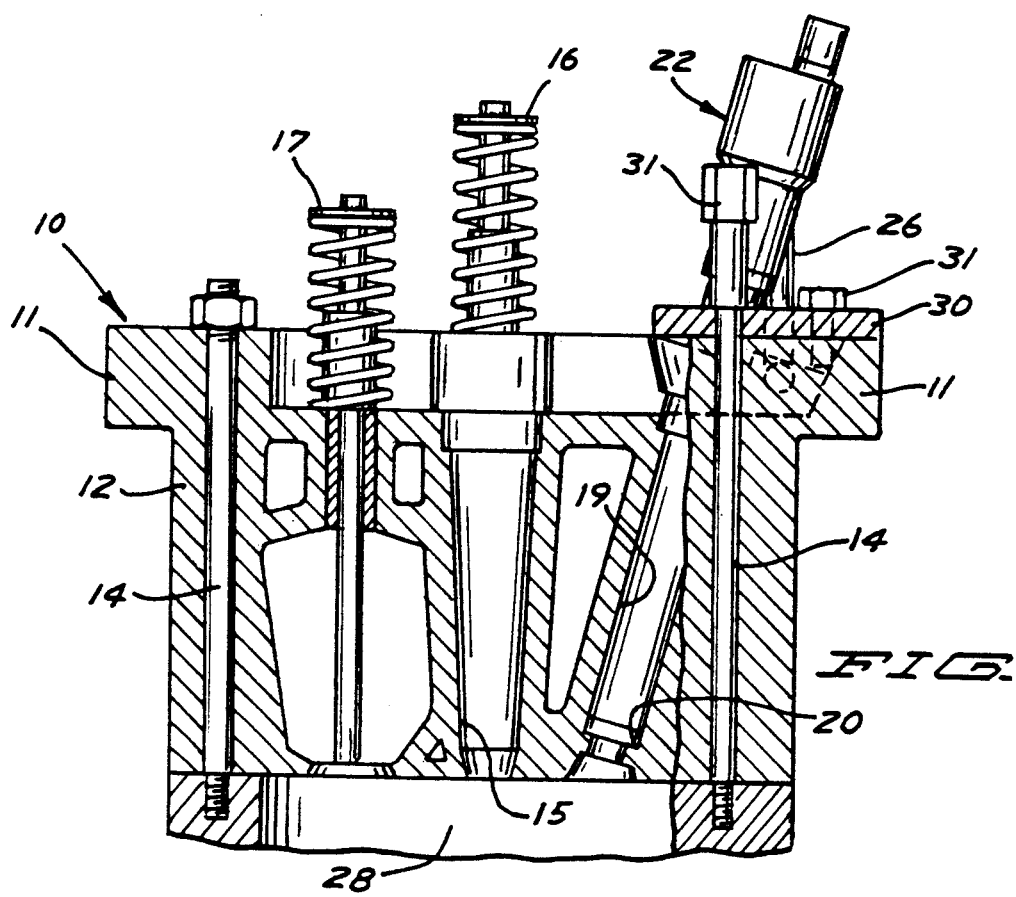
FIG. 2 is a view in vertical section taken on lines 2—2 of FIG. 1 as indicated.
Figure 3:
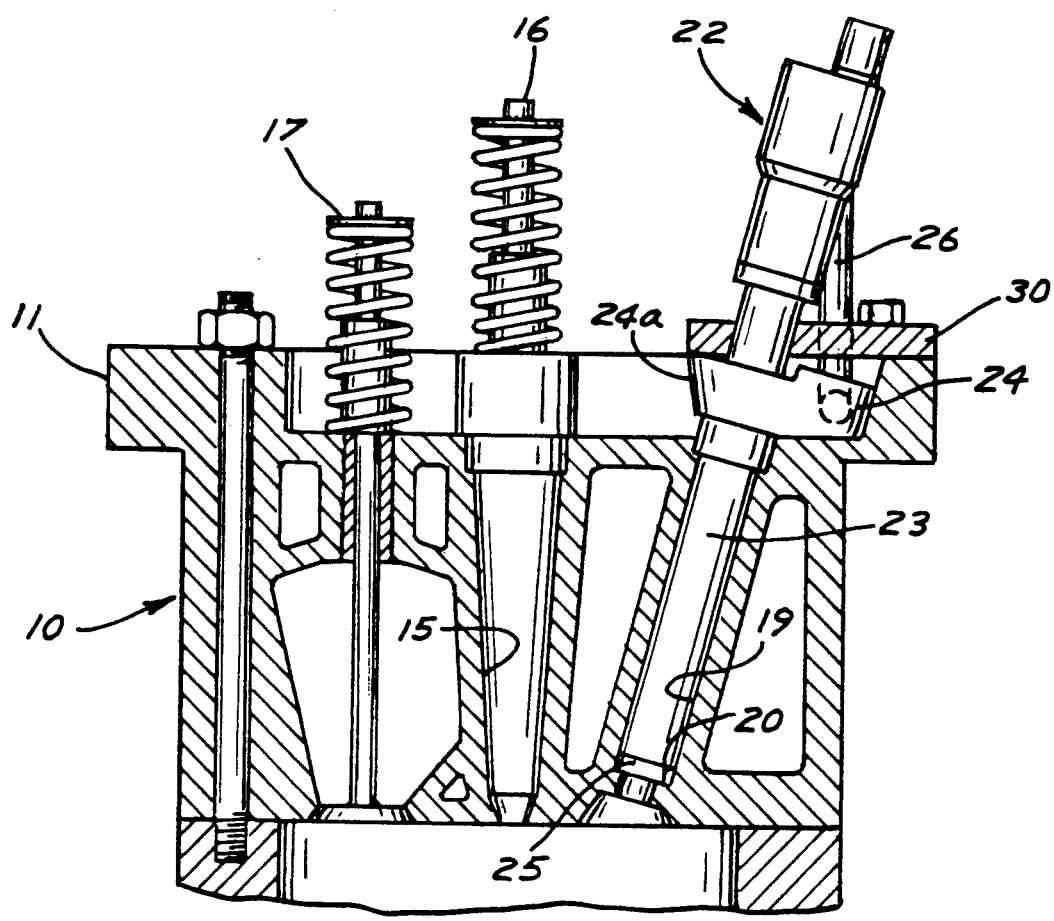
FIG. 3 is a view in vertical section taken on lines 3—3 of FIG. 1 as indicated.

Referring to the drawings and more particularly to FIGS. 2-3, a typical diesel fuel engine cylinder 10 is shown in vertical section embodying a cylinder head 11 and a cylinder liner 12, said cylinder head being secured to said liner by studs represented by the stud bolts 14. Said cylinder head and liner are bored at 15 to have a conventional diesel fuel injector valve 16 therein and in addition there are conventionally four exhaust valves, the same being represented by the exhaust valve 17.

Reference is made to applicant's prior U.S. Pat. No. 5,136,986 for a detailed description of a gaseous fuel inlet injector valve 22. As will be described, the essential novelty of the gaseous fuel injector valve herein is in its particular mounting in said cylinder 10.

Cast into said cylinder head and extending down through the cylinder liner is gaseous fuel injector valve bore 19 having a counter bore or seat 20 at the interior bottom thereof.

Referring to FIG. 3, said gaseous fuel inlet injector valve 22 is shown disposed into said bore 19. It will be noted that said bore is disposed at an angle, said bore having been sized to receive said valve.

Said gaseous fuel injector valve comprises a valve body 23, the lower end of which is formed as a valve seat 25 having a sealing fit into said internal seat 20 of said bore.

Said valve body 23 of said valve 22 is inserted into said bore 19 from the top thereof thereinto and is removed in a like manner through the top without disturbing the remainder of the cylinder. This is directly contrasted to a like prior art structure as shown in FIG. 4 to be hereinafter described.

Further said gaseous fuel injector valve includes a gas supply inlet fitting 26 which is mounted onto and welded to a gas bell 24. Said gas bell slips onto said valve body 23 and is held down in position by an overlying plate member 30 which is seated upon said cylinder head as shown in FIGS. 2 and 3. Said valve has direct access to the combustion chamber (not shown) of the cylinder.

Said plate member is secured down by crab bolts 31 of which two are shown. Said plate, in FIG. 3, is shown bearing down upon a shoulder portion 24a of said gas bell and thus secures said ejector valve within said bore. Said plate member 30 in engaging said shoulder portion has a portion thereof fitting about the body portion 23 of said gaseous fuel injector valve as indicated in FIG. 3.

Figure 4:
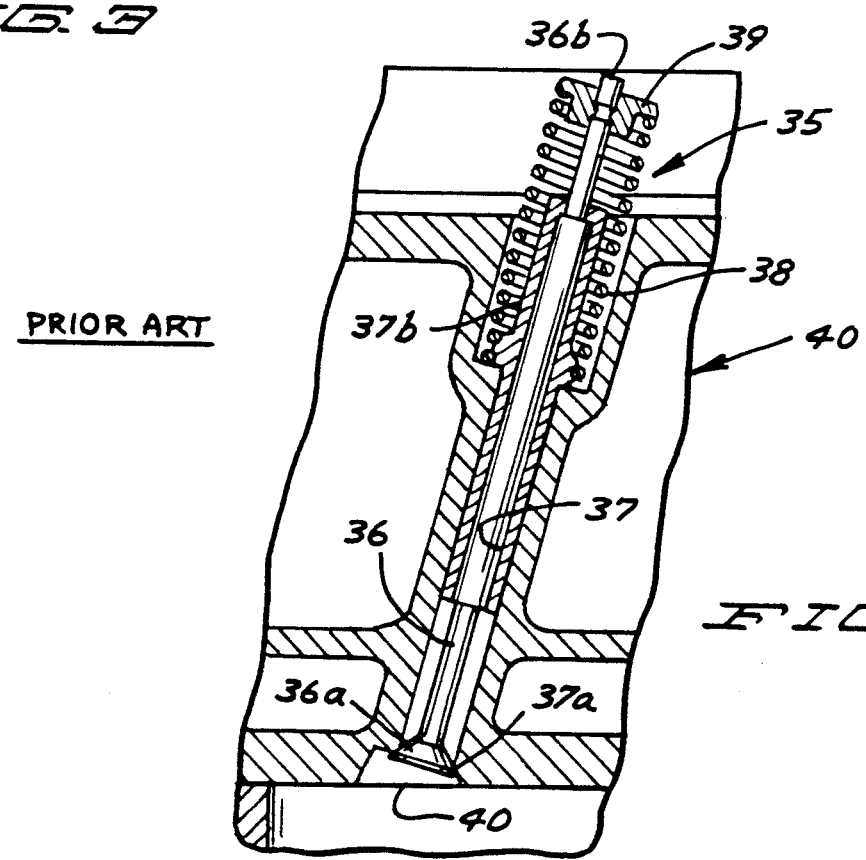
FIG. 4 is a prior art showing of a gaseous fuel injector valve in vertical section.

Reference is now had to FIG. 4 and the prior art injector valve 35 of which the valve stem 36 is disposed upwardly through the bore 37 in a cylinder 40 and the lower end of said valve stem 36a is shown to be seated externally of said bore against the outer or external seat 37a thereof. A counter bore 37b within said bore forms a shoulder to support a spring 38 bearing thereagainst by a nut 39 threaded on to the top 36b of said valve stem to secure the same within said bore by pressure exerted in holding the valve stem bottom 36a against said external seat 37a.

Here it is seen that removal of the valve stem for service or replacement of the valve requires removal through the bottom 40 of said cylinder which requires the cylinder to become inoperative.

OPERATION

As has been indicated, for a description of the internal structure and operation of said valve 22 except for the modification herein, reference is had to applicant's prior U.S. Pat. No. 5,136,986.

For purposes herein, the specific novelty of said injector valve relates to its being capable of independent installation and removal, as for service or replacement, without the remainder of the valve head or cylinder being disturbed. Thus servicing said injector valve or its replacement is a matter of convenient accomplishment.

It will of course be understood that various changes may be made in the form, details, arrangement and proportions of the invention without departing from the scope of the invention which, generally stated, consists in a product capable of carrying out the objects above set forth, in the parts and combination of parts disclosed and defined in the appended claims.

What is claimed is:

1. A cylinder in an internal combustion engine including a cylinder head having a liquid fuel injector valve and a plurality of exhaust valves, including
    a bore in said cylinder head for a gaseous fuel injector valve,
    said bore having a counter bore seat at the inner bottom thereof,
    a body of said gaseous fuel injector valve disposed in said bore and seated on said counter bore seat,
    said cylinder having a combustion chamber,
    said gaseous fuel injector valve body providing said gaseous fuel injector direct access to said combustion chamber,
    a plate number disposed over an edge portion of said gaseous fuel injector valve and overlying a portion of said gaseous fuel injector valve,
    means securing said plant member to said cylinder head,
    whereby said gaseous fuel injector valve is inserted into and removed from said cylinder said cylinder head without disturbing the remainder of the cylinder and wherein,
    said gaseous fuel injector includes a gas supply inlet fitting,
    said fitting is mounted onto a gas bell,
    said gas bell slips onto said gaseous fuel injector valve body, whereby
    said plate member overlies said gas bell securing the same.

* * * * *